United States Patent [19]

Thurow

[11] Patent Number: 5,566,929
[45] Date of Patent: Oct. 22, 1996

[54] ROLLING-LOBE AIR SPRING HAVING A FLEXIBLE MEMBER MADE OF ELASTOMERIC MATERIAL

[75] Inventor: Gerhard Thurow, Garbsen, Germany

[73] Assignee: Continental Aktiengesellschaft, Hanover, Germany

[21] Appl. No.: 498,443

[22] Filed: Jul. 5, 1995

[30] Foreign Application Priority Data

Jul. 6, 1994 [DE] Germany .......................... 44 23 601.8

[51] Int. Cl.⁶ ......................................... F16F 9/04
[52] U.S. Cl. .................... 267/64.24; 267/64.27
[58] Field of Search ............................. 267/35, 148, 149, 267/64.11, 64.24, 64.27; 152/526, 535, 538, 361; 152/361

[56] References Cited

U.S. PATENT DOCUMENTS

| | | |
|---|---|---|
| 3,897,941 | 8/1975 | Hirtreiter et al. . |
| 4,763,883 | 8/1988 | Crabtree .................. 267/64.27 |
| 5,201,499 | 4/1993 | Elliott et al. ............ 267/64.27 |
| 5,286,010 | 2/1994 | Pahl et al. ............... 267/64.27 |
| 5,346,187 | 9/1994 | Drescher ................. 267/64.27 |

FOREIGN PATENT DOCUMENTS

| | | |
|---|---|---|
| 1115437 | 10/1961 | Germany . |
| 2547409 | 4/1977 | Germany . |
| 4009495 | 9/1991 | Germany . |
| 2015691 | 9/1979 | United Kingdom . |

Primary Examiner—Robert J. Oberleitner
Assistant Examiner—Chris Schwartz
Attorney, Agent, or Firm—Walter Ottesen

[57] ABSTRACT

A rolling-lobe air spring is made of elastomeric material and includes a reinforcement layer made of rubberized textile cord fabric layers. The reinforcement layer extends over the length of the flexible member of the air spring. The cord threads of the textile cord fabric layers are arranged so that they are inclined relative to the peripheral direction of the flexible member. During operation, a rolling lobe is formed which changes during spring operation. The reinforcement layer includes three rubberized cord fabric layers (21, 22, 23) one atop the other. This provides a rolling-lobe air spring having a longer service life at higher internal pressures and smaller roll-off radii in the rolling lobe. The threads of the middle cord fabric layer 22 are arranged so as to cross the threads of the first and third layers. The middle cord fabric layer 22 has a strength which corresponds to the sum of the strengths of the first and third layers.

12 Claims, 3 Drawing Sheets

ROLLING-LOBE AIR SPRING HAVING A FLEXIBLE MEMBER MADE OF ELASTOMERIC MATERIAL

FIELD OF THE INVENTION

The invention relates to a rolling-lobe air spring having a flexible member made of elastomeric material. The flexible member has a reinforcement layer made of rubberized cord fabric layers. The reinforcement layer is embedded in the wall defined by the flexible member and extends over the entire length thereof. The cord threads of the cord fabric layer are inclined with respect to the peripheral direction of the wall. During operation, the flexible member of the air spring defines a rolling lobe which moves with the spring action.

BACKGROUND OF THE INVENTION

Rolling-lobe air springs have been widely used with success as motor-vehicle springs and especially for suspending the wheel axles of trucks and buses. The flexible member of the air spring is attached at one end to a roll-off piston which is usually made of metal or plastic. In the operating state, the piston moves within the flexible member which is pushed over the roll-off piston so that the flexible member defines a rolling lobe which rolls over the outer surface of the roll-off piston.

The reinforcement layer takes up the forces which occur because of the overpressure in the flexible member of the air spring. The cord fabric layer in air-spring flexible members preferably is made of fully synthetic fibers such as nylon. The so-called cord fabric is produced from the textile cord threads. The cord fabric comprises a multiplicity of cord threads in warp direction lying parallel one next to the other. The cord threads are held loosely together at greater distances by a few thin threads in weft direction. This cord fabric layer is rubberized with a suitable rubber mixture such as a polychloroprene mixture and, after being cut at an angle, is built into the air-spring flexible member with two, four or six layers so that the threads lie crosswise. Depending upon the air spring type, the textile cord threads of the two cord fabric sheets define a symmetrical thread angle of approximately 40° to 80° with respect to the peripheral direction.

Cord fabrics can transmit only forces in one direction. For this reason, the rolling-lobe air spring has a symmetrical arrangement of the cord fabric layers, that is, two, four or six fabric layers which mutually cross. Most air springs for street motor vehicles are, however, produced only with two mutually crossing fabric layers in order to achieve a high flexibility of the flexible member of the rolling-lobe air spring.

Recent developments in motor vehicles and chassis, especially in the area of passenger cars, require increasingly smaller air spring types having correspondingly increasing operating pressures. The space available for building in the air spring is minimal in a passenger vehicle. The rolling-lobe air springs can therefore only have a small diameter and have small bending radii in the roll-off zone. The small rolling-lobe air springs therefore require the use of especially valuable elastomeric materials.

The two-layer configuration of the reinforcement layer for these small air spring types of the passenger vehicle area is no longer adequate because the air springs must withstand higher pressures during operation, such as 10 bar and higher. In order to withstand the higher operating pressures, it would be conceivable to arrange four or six cord fabric layers men the wall of the flexible member. Because of the small configuration of the rolling-lobe air spring, the strengthened reinforcement layers must, however, be very thin because a greatly reduced roll-off radius is present and thicker reinforcement layers can lead to a destruction of the wall defined by the flexible member of the air spring. This is caused, for example, in a four-layer reinforcement layer in that the threads of the inner-lying cord fabric layer becomes bunched and are destroyed. This leads to a greatly reduced strength of the rolling-lobe air spring.

SUMMARY OF THE INVENTION

It is an object of the invention to provide a rolling-lobe air spring of the kind described above which provides a long service life with high interior pressures and small roll-off radii in the rolling lobe.

The rolling-lobe air spring of the invention is for attachment to first and second attachment parts. The second attachment part includes a roll-off piston. The rolling-lobe air spring includes: a flexible member defining a longitudinal axis and being made of elastomeric material; the flexible member having a predetermined length and having first and second longitudinal end portions for attachment to the first and second attachment parts, respectively; the flexible member having a pregiven longitudinal active portion within which a rolling lobe is formed as the longitudinal active portion rolls back and forth over the roll-off piston during the operation of the air spring; a composite reinforcement layer extending over the length of the flexible member; the composite reinforcement layer including first, second and third rubberized cord fabric layers disposed one atop the other; the first and third cord fabric layers having first and third sets of cord threads inclined with respect to the circumference of the flexible member; the second cord fabric layer being sandwiched between the first and third cord fabric layers; the second cord fabric layer having a second set of cord threads also inclined with respect to the circumference of the flexible member and the threads of the second set of cord threads being arranged crosswise with respect to the threads of both the first and third sets of cord threads; and, the second cord fabric layer having a strength which corresponds to the sum of the strengths of the first and third cord fabric layers.

The three-layer air spring has increased adhering surfaces for transmitting the thread forces. The two outer cord fabric layers must together correspond to the layer strength of the middle cord fabric layer in order to prevent twisting of the rolling-lobe air spring. The three-layer air spring, with the different cord fabric layers, has approximately the same bending stiffness as the two-layer air spring but advantageously has 65% more adhering surfaces. This leads to an increase of the service life of the rolling-lobe air spring.

The configuration of the middle cord fabric layer provides that this layer can take up a greater tension force. This can be advantageously achieved via a greater cross sectional surface of the textile cord threads or via a higher tensile strength of the cord material. This leads to an overall thin reinforcement layer with high tensile strength which effects the desired bending capability accompanied by a long service life of the rolling-lobe air spring.

According to another feature of the invention, the number of threads of the outer cord fabric layer is less than the number of threads of the middle cord fabric layer. In this way, the threads of the middle cord fabric layer are adjusted so as to be snug next to each other; whereas, the thread pitch of the two outer cord fabric layers is further apart.

BRIEF DESCRIPTION OF THE DRAWINGS

The invention will now be described with reference to the drawings wherein.

DESCRIPTION OF THE PREFERRED EMBODIMENTS OF THE INVENTION

Figures 1, 1A:
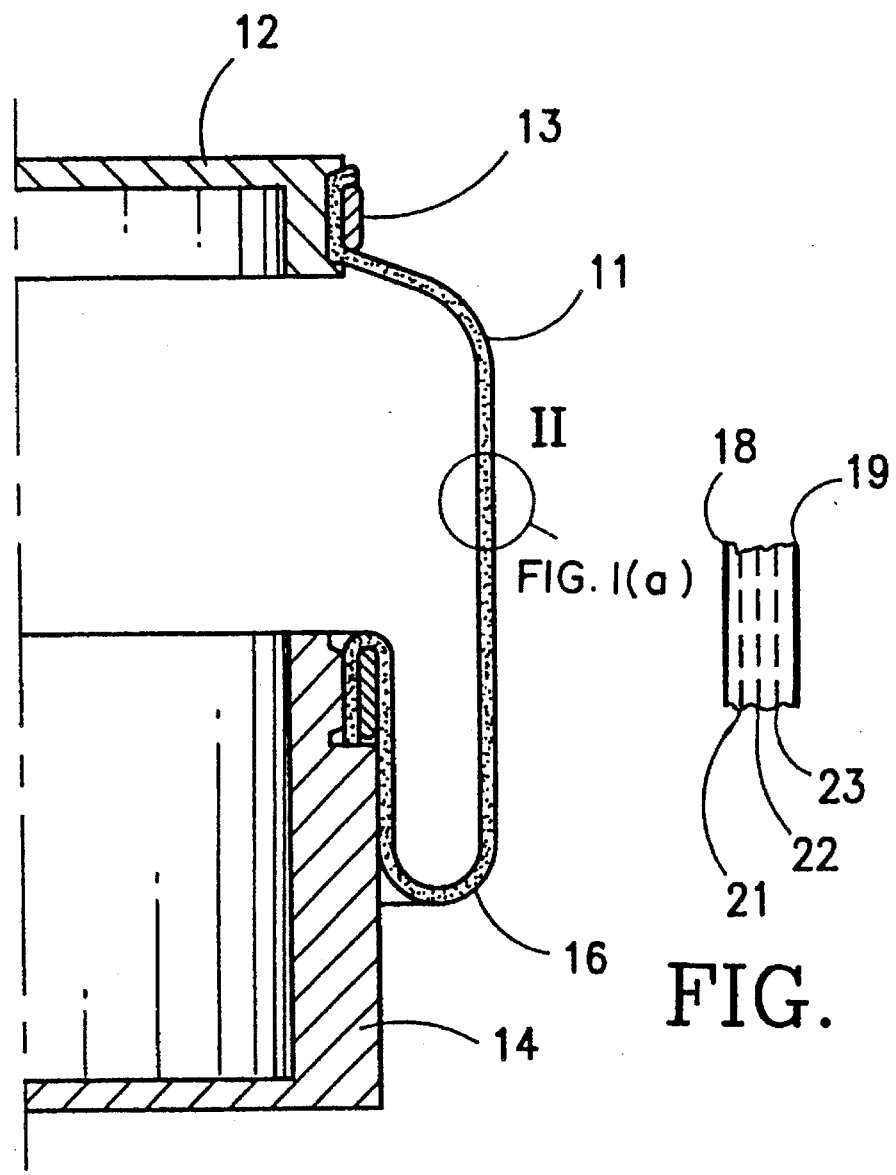
FIG. 1 is a half section view of a mounted rolling-lobe air spring according to the invention.

The rolling-lobe air spring 11 shown in FIG. 1 is attached seal-tight at its upper end to a connecting part 12 by a radially pressed clamp ring 13. The lower end of the rolling-lobe air spring 11 is attached to a roll-off piston 14 and is pushed over the piston 14 so that a rolling lobe 16 is provided which is braced on the outer wall surface of the roll-off piston 14. The rolling-lobe air spring 11 is configured as a tubular rolling lobe. The roll-off radius, that is, the bending radius of the rolling fold 16, is very tight. The rolling lobe or rolling fold 16 rolls over the external wall of the roll-off piston 14 during spring compression and rebound of the roll-off piston 14.

The wall 17 of the flexible member of the rolling-lobe air spring 11 comprises an inner rubber layer 18 and an outer rubber layer 19. Three rubberized cord fabric layers (21, 22, 23) are embedded between the inner and outer rubber layers 18 and 19. These cord fabric layers (21, 22, 23) extend over the entire length of the flexible member of the rolling-lobe air spring.

The cord fabric layers (21, 22, 23) are embedded in core rubber and built into the rolling-lobe air spring 11 so that they are one atop the other. In this way, a thin rubber adhering layer 25 is produced between each two mutually adjacent ones of the cord layers (21, 22, 23). Accordingly, two rubber adhering layers 25 are provided in the reinforcement layer which leads to an increase of the force which can be transmitted.

The reinforcement layer is embedded in the elastomeric wall 17 of the flexible member and comprises the three cord fabric layers 21, 22 and 23. The thread angle of the cord fabric is usually between 40° and 80°. The two outer cord fabric layers 21 and 23 have the same thread direction. The center fabric layer 22 is enclosed by the two fabric layers 21 and 23 and has an opposite thread angle so that the threads of this center layer cross with the other two layers.

Figure 2:
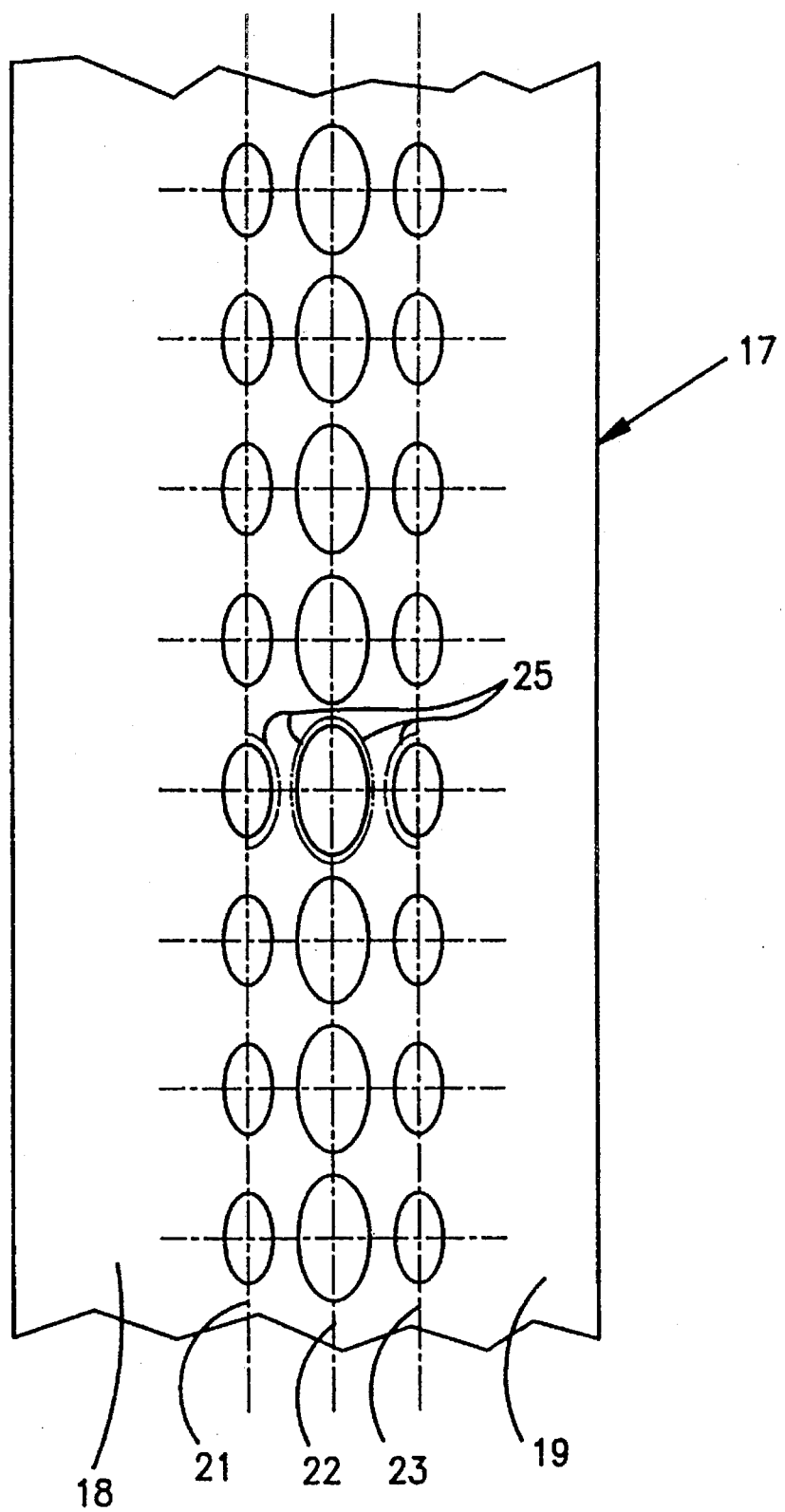
FIG. 2 is an enlarged view of the detail of the wall of the flexible member within the circle II of FIG. 1; and, FIG. 3 is a schematic plan view of the three fabric layers in a broken-out section of the wall of the flexible member.
Figure 3:
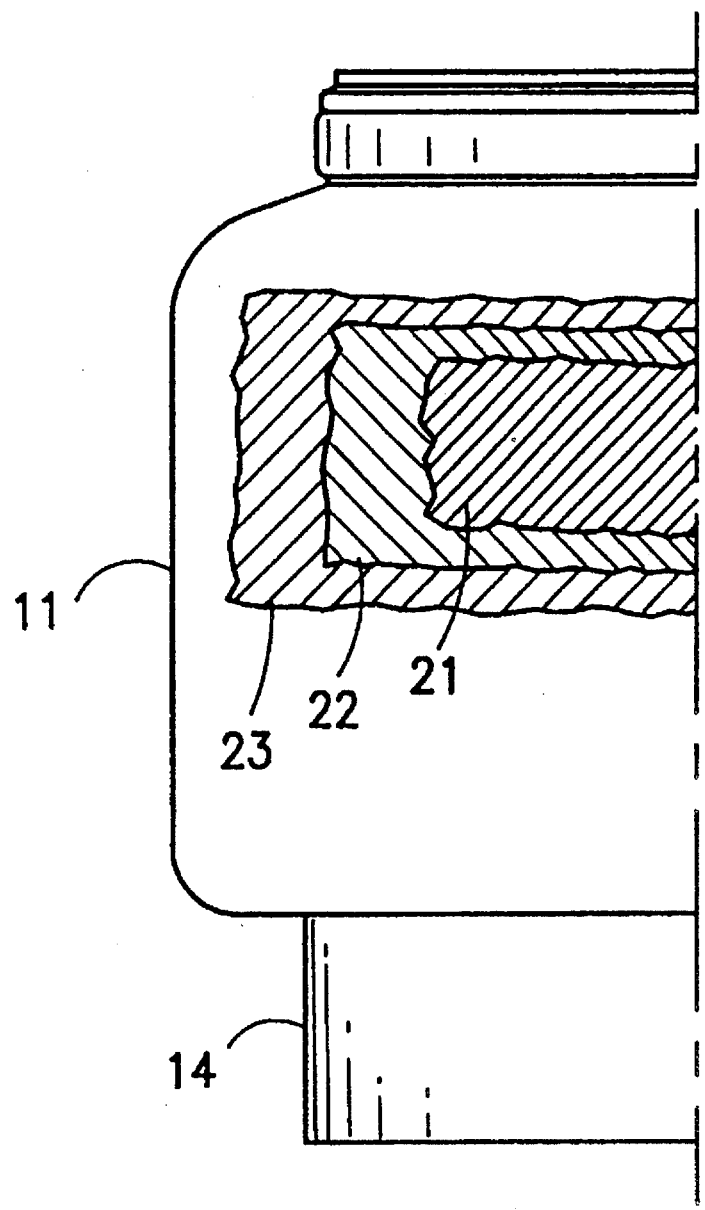

In FIG. 2, it can be seen that the threads of the middle fabric layer 22 have a greater diameter than the threads of the two other fabric layers 21 and 23. The threads of the middle fabric layer 22 are also made of nylon which has a tearing strength which is as great as the sum of the tearing strengths of the first and third =fabric layers 21 and 23. The ultimate elongation and the trace of the elongation curves of all fabric layers are selected to be the same in order to avoid an unwanted twisting of the rolling-lobe air spring during operation.

The adhering surfaces of the elastomeric material are increased by the third additional cord fabric layer 22. In this way, the load-carrying capability of the rolling-lobe air spring is increased because this is primarily dependent upon the load which can be carried by the adhering surfaces disposed between the cord fabric layers (21, 22, 23).

It is understood that the foregoing description is that of the preferred embodiments of the invention and that various changes and modifications may be made thereto without departing from the spirit and scope of the invention as defined in the appended claims.

What is claimed is:

1. A rolling-lobe air spring for attachment to first and second attachment parts, the second attachment part including a roll-off piston, the rolling-lobe air spring comprising:

a flexible member defining a longitudinal axis and being made of elastomeric material;

said flexible member having a predetermined length and having first and second longitudinal end portions tightly held by said first and second attachment parts, respectively;

said flexible member having a pregiven longitudinal active portion within which a rolling lobe is formed as said longitudinal active portion rolls back and forth over said roll-off piston during the operation of the air spring;

a composite reinforcement layer extending over all of said predetermined length of said flexible member;

said composite reinforcement layer including first, second and third rubberized cord fabric layers disposed one atop the other;

said first, second and third cord fabric layers likewise extending over all of said predetermined length of said flexible member so that said composite reinforcement layer is also tightly held by said attachment parts;

said first and third cord fabric layers having first and third sets of cord threads inclined with respect to the circumference of said flexible member;

said second cord fabric layer being sandwiched between said first and third cord fabric layers;

said second cord fabric layer having a second set of cord threads also inclined with respect to the circumference of said flexible member and the threads of said second set of cord threads being arranged crosswise with respect to the threads of both said first and third sets of cord threads; and, said second cord fabric layer having a strength which corresponds to the sum of the strengths of said first and third cord fabric layers.

2. The rolling-lobe air spring of claim 1, the cord threads of said second set of cord threads having a cross section greater than the cross section of the cord threads of said first and third sets of cord threads.

3. The rolling-lobe air spring of claim 1, the cord threads of said second set of cord threads each having a diameter greater than the diameter of each of the cord threads of said first and third sets of cord threads.

4. The rolling-lobe air spring of claim 1, the number of cord threads in each of said first and third sets of cord threads being less than the number of cord threads in said second set of cord threads.

5. The rolling-lobe air spring of claim 1, wherein said rubberized cord fabric layers are only three in number.

6. The rolling-lobe air spring of claim 1, wherein the number of said rubberized reinforcement cord fabric layers are an odd number of at least three.

7. A rolling-lobe air spring for attachment to first and second attachment parts, the second attachment part including a roll-off piston, the rolling-lobe air spring comprising:

a flexible member defining a longitudinal axis and being made of elastomeric material;

said flexible member having a predetermined length and having first and second longitudinal end portions tightly held by said first and second attachment parts, respectively;

said flexible member having a pregiven longitudinal active portion within which a rolling lobe is formed as said longitudinal active portion rolls back and forth over said roll-off piston during the operation of the air spring;

said flexible member including an inner rubber layer and an outer rubber layer;

a composite reinforcement layer extending over the entire length of said flexible member;

said composite reinforcement layer including first, second and third rubberized cord fabric layers disposed one atop the other and said cord fabric layers being embedded between said inner and outer rubber layers;

said first and third cord fabric layers having first and third sets of cord threads inclined with respect to the circumference of said flexible member;

said second cord fabric layer being sandwiched between said first and third cord fabric layers to define a thin rubber adhering layer between each two mutually adjacent ones of said cord fabric layers;

said cord fabric layers extending over all of said predetermined length of said flexible member so that all three of said cord fabric layers are also tightly held by said attachment parts;

said second cord fabric layer having a second set of cord threads also inclined with respect to the circumference of said flexible member and the threads of said second set of cord threads being arranged crosswise with respect to the threads of both said first and third sets of cord threads; and, said second cord fabric layer having a tearing strength which corresponds to the sum of the tearing strengths of said first and third cord fabric layers.

8. The rolling-lobe air spring of claim 7, the cord threads of said second set of cord threads having a cross section greater than the cross section of the cord threads of said first and third sets of cord threads.

9. The rolling-lobe air spring of claim 7, the cord threads of said second set of cord threads each having a diameter greater than the diameter of each of the cord threads of said first and third sets of cord threads.

10. The rolling-lobe air spring of claim 7, the number of cord threads in each of said first and third sets of cord threads being less than the number of cord threads in said second set of cord threads.

11. The rolling-lobe air spring of claim 7, wherein said rubberized cord fabric layers are only three in number.

12. The rolling-lobe air spring of claim 7, wherein the number of said rubberized reinforcement cord fabric layers are an odd number of at least three.

\* \* \* \* \*

UNITED STATES PATENT AND TRADEMARK OFFICE
CERTIFICATE OF CORRECTION

PATENT NO. : 5,566,929
DATED : October 22, 1996
INVENTOR(S) : Gerhard Thurow It is certified that error appears in the above-identified patent and that said Letters Patent is hereby corrected as shown below:

In column 1, line 67: delete "men" and substitute -- in -- therefor.

In column 2, line 8: delete "becomes" and substitute -- become -- therefor.

In column 3, line 4: delete "wherein;" and substitute -- wherein: -- therefor.

In column 3, line 57: delete "=fabric" and substitute -- fabric -- therefor.

Signed and Sealed this

Seventeenth Day of December, 1996

Attest:

BRUCE LEHMAN

*Attesting Officer*  *Commissioner of Patents and Trademarks*